June 23, 1964   E. G. GRIFFITHS   3,138,397
MODULAR SEAM FASTENER
Original Filed Oct. 21, 1960   3 Sheets-Sheet 1

*INVENTOR.*
EDWARD G. GRIFFITHS
BY John P. Chandler
HIS ATTORNEY.

June 23, 1964   E. G. GRIFFITHS   3,138,397
MODULAR SEAM FASTENER
Original Filed Oct. 21, 1960   3 Sheets-Sheet 2
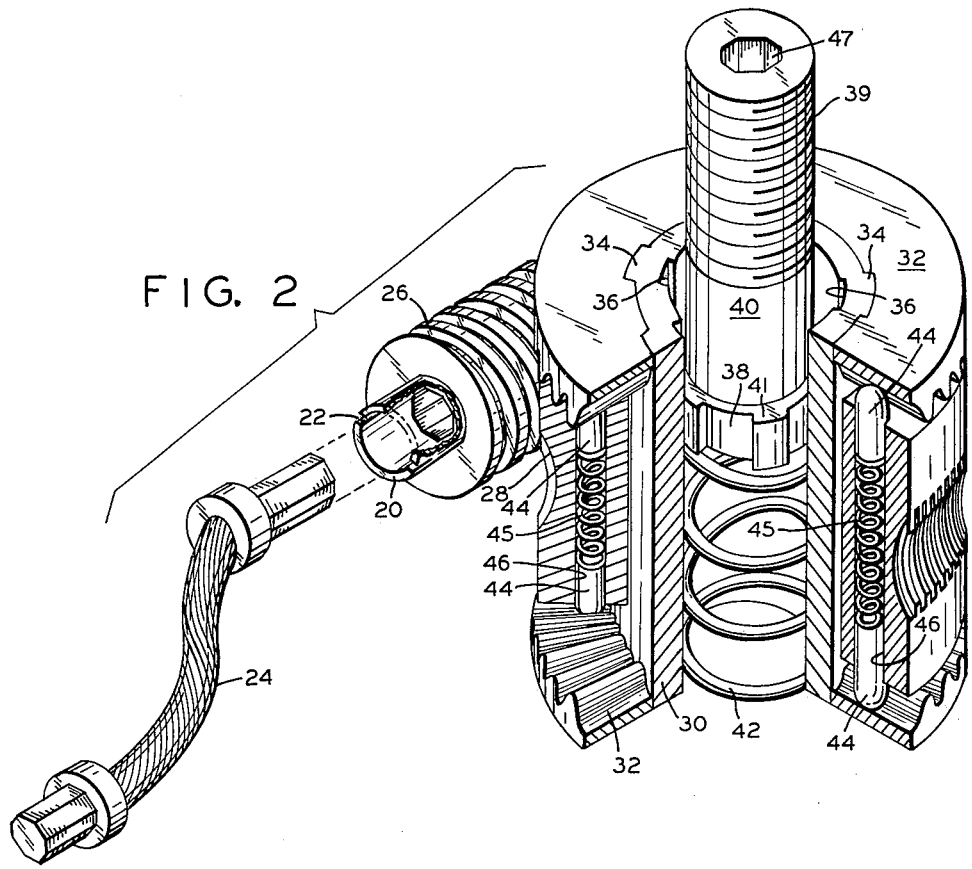
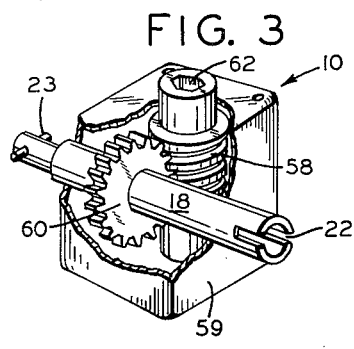
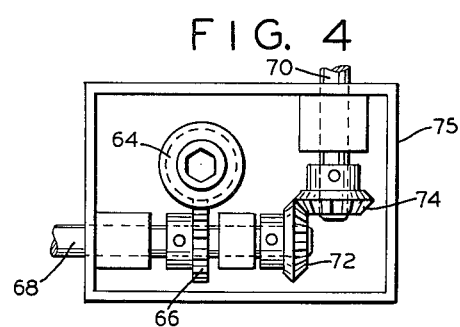
INVENTOR.
EDWARD G. GRIFFITHS
BY John P. Chandler
HIS ATTORNEY.

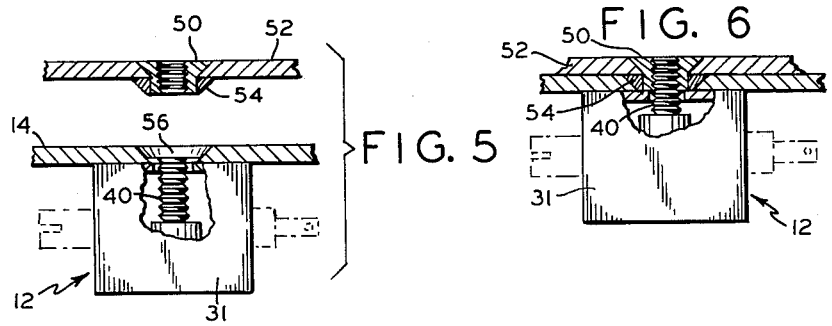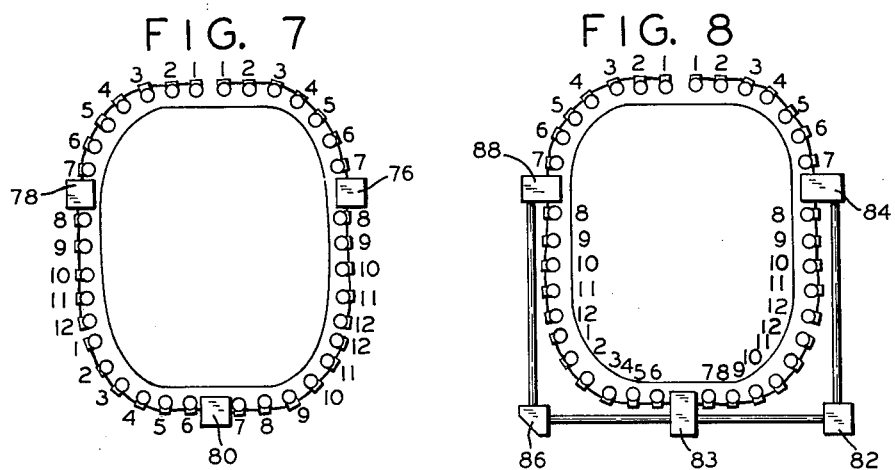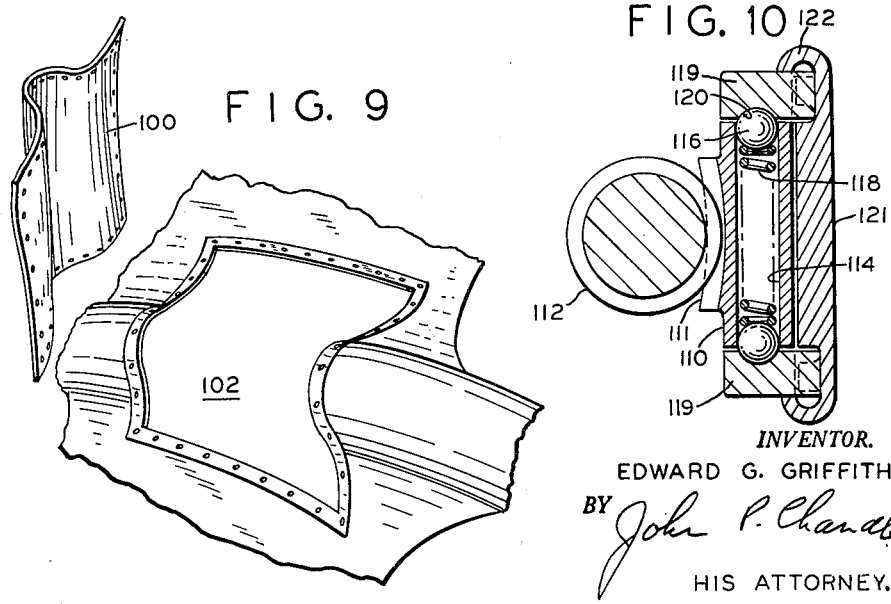

United States Patent Office 3,138,397
Patented June 23, 1964

3,138,397
MODULAR SEAM FASTENER
Edward G. Griffiths, Maywood, N.J., assignor to Camloc Fastener Corporation, Paramus, N.J., a corporation of New York
Continuation of application Ser. No. 64,048, Oct. 21, 1960. This application May 22, 1962, Ser. No. 200,011
16 Claims. (Cl. 292—251)

This invention relates to fastening devices and has particular reference to a modular seam fastener comprising two basic units, one of which is operated by the other. By coupling together several driven units and one driver unit, the assembly can be used advantageously for removably fastening a seam having almost any shape, size, and surface contour.

As used throughout the specification and claims, the term "operator" refers to the driver unit, and the term "receptacle" refers to the driven unit.

An object of the present invention is to provide a universal seam fastener including a plurality of spaced-apart units interconnected in such manner as to be operable from one unit for fast removal and assembly of a cover having a variety of contours.

Another object is to provide a seam fastener adaptable to a substantially unlimited variety of seam sizes and contours.

Still another object is to permit the operation of a plurality of fasteners from one control unit.

Another object is to enable a light torque applied to the control unit to be converted into a larger torque in the fastener.

A further object is to insure locking of the fastener against loosening.

One feature of the invention includes a modular seam fastener comprising an operator coupled by a flexible shaft to several receptacles positioned adjacent the edge of a seam. The operator mechanism is essentially a speed reducer mechanism. Each receptacle consists of a gear reduction unit, a slip clutch and a fastener stud all enclosed within a housing. The units are coupled together in a series or chain-like fashion. A plurality of nut-grommets are mounted in a panel in spaced apart relationship to match and consequently mate with each fastener stud.

The universal fastener of the present invention is thus built up of modules comprising two basic units, the operator and a receptacle connected by a flexible shaft. A worm wheel in the receptacle drives a worm operatively connected with the threaded stud of the fastener. This worm wheel also acts as a lock for the fastener. Since one fastener stud may lock up before some of the others, a novel slip clutch is provided so that when one stud is fully engaged a clutch arrangement permits the drive for that stud to slip and allow the others to be pulled up. Also, in the event that the pull-up load on a receptacle is beyond its capacity, its clutch will slip until the adjacent receptacles catch up. The pull-up load will thus be distributed over more receptacles and when the pull-up load per receptacle is reduced enough the clutch will cut in and all receptacles will pull up together.

Another object of the invention is to provide a novel fastener unit for use in a fastener assembly of the character described which can be operated from the single operator or driving unit, or which can be individually operated either manually or by power means which is an important feature to permit unfastening in the event of a power failure at the central driving unit, or in the event the driving connections to the driving unit fail for some reason. In fact, the individual fastener units have great utility as separate elements in certain types of illustrations.

In the drawings:

FIG. 2 is a perspective showing the internal construction of a receptacle with the housing omitted.

FIG. 3 is a perspective of the operator unit.

FIG. 4 is a plan view of the internal construction of a right-angle operator.

FIG. 5 is an elevational view partly in section illustrating a typical receptacle installation with the stud disengaged.

FIG. 6 is a view similar to FIG. 5 but showing the stud engaged.

FIG. 7 is a schematic of a typical arrangement of several chains of receptacles each having individual operators.

FIG. 8 is a schematic similar to FIG. 7 including a master operator.

FIG. 9 is a perspective of a typical application having varied contours.

FIG. 10 shows a ball detent arrangement incorporated into the drive.

Figure 1:
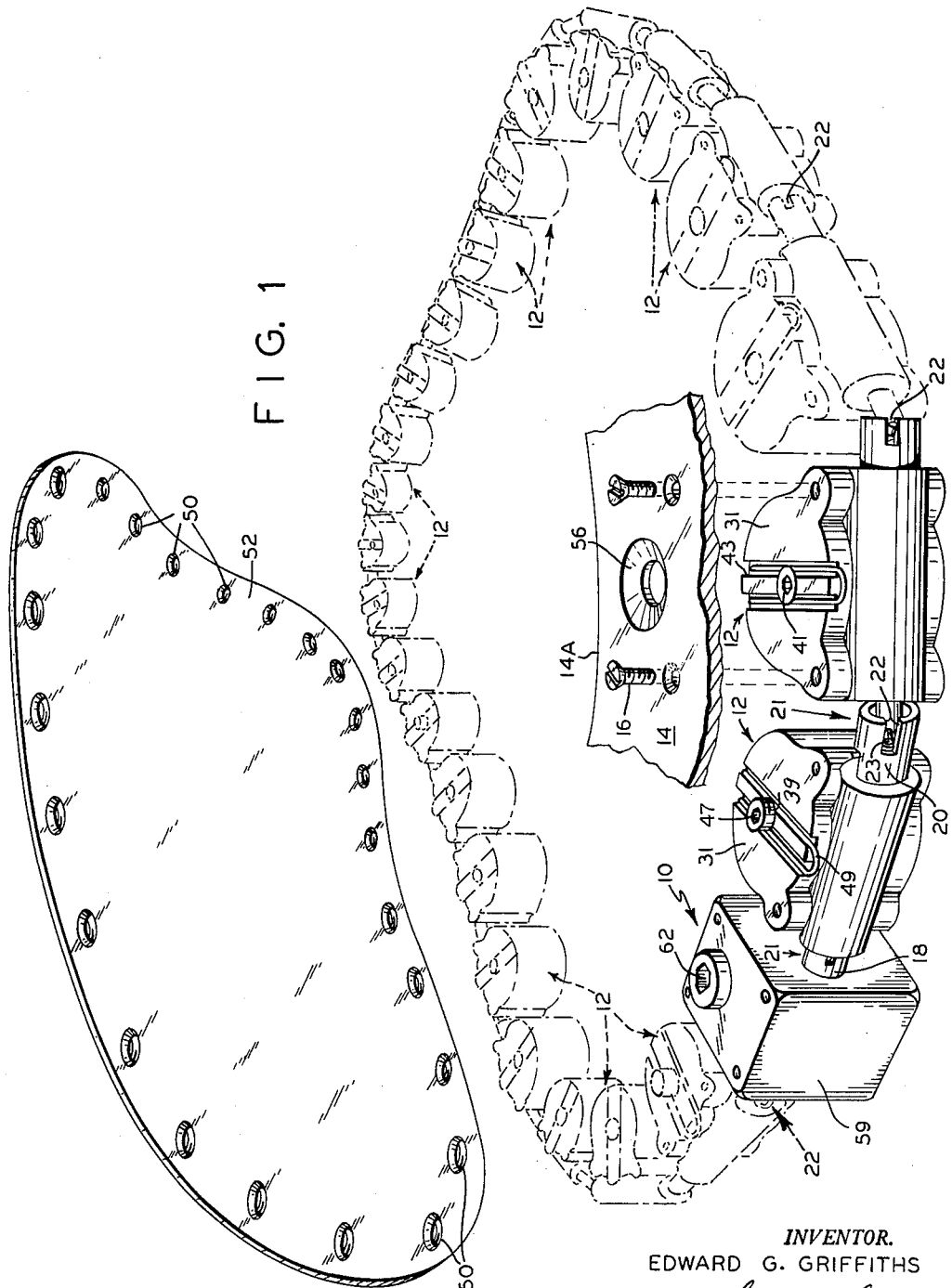
FIG. 1 is a perspective illustrating a possible application of the invention.

One particular arrangement chosen to illustrate the invention is shown in FIG. 1. An operator 10 and a plurality of receptacles or fastener units 12 are permanently mounted inside a stationary frame 14 by attaching screws 16 where these operative members are protected from any exterior destructive influence. They are secured adjacent the edge 14A of an opening and therefore assume the shape of the opening. In most installations frame 14 will be part of a fixed structure or it may be a separate member secured to such structure. A drive shaft 18 projects from opposite sides of the operator 10 and is connected at each end to the shaft 20 of a receptacle or fastener 12 through a universal coupling 21 which may comprise a slot 22 at one end and a cross-pin 23 at the other end which is received in the slot in non-rotative relation. Each receptacle in turn is coupled to the next adjacent receptacle in a series or chain-like arrangement, following the contour of the seam.

It will be understood that any suitable coupling can be used in place of the universal coupling 21. For example, a flexible shaft 24, FIG. 2, is entirely suitable, especially where irregular contours are present.

Each receptacle is constructed with a worm 26 and worm-wheel 28 forming a speed reduction unit which converts a small torque from the worm to a greater torque in the worm-wheel. This arrangement further provides a lock to secure the worm-wheel against rotation when the worm is not in rotation. The worm-wheel 28 is rotatably mounted upon a sleeve 30 mounted in a frame or housing 31. A circular toothed rack 32 is mounted upon each end of the sleeve 30 and secured by short splines 34 on the outer surface of the sleeve 30 at each end thereof. The inner wall of the sleeve is also formed with splines 36 to receive a splined end 38 of a stud 40 having threads 39. A spring 42 is also received in the sleeve 30 to urge the stud resiliently upward. This spring is seated at its lower end in the bottom wall of housing 31 and upward movement of stud 40 is limited by a collar 41 at the lower splined end which contacts the upper wall of the housing which is provided with a hole large enough to permit the passage of the stud, but not the collar, therethrough. The racks 32 are assembled on the sleeve 30 so that teeth face the worm-wheel which contains a plurality of axially positioned pins 44 slidably inserted in holes 46 in the worm-wheel. A spring 45 is received in each of the holes 46 which serves to urge the pins 44 resiliently against the teeth of the racks 32 to provide a slip clutch. The housing 31, as best seen in FIG. 1, encloses the above described receptacle mechanism and contains suitable bearings and supports (not shown) for the proper functioning of the mechanism. The upper wall of the housing 31 is formed with spaced slots 43 which receive the two legs of a U-shaped spring clip or "nut" 49 which are received in the threads 39 of stud 40, and as the stud is rotated this spring nut causes the stud to travel inwardly or outwardly. This spring nut has only a very small clamping force which is easily overcome. If there is panel separation it causes the stud to reach outwardly to the nut. When it is desired to retract the stud into the housing reverse rotation of the stud achieves this result. The spring clip may be postioned in spaced slots 43 and the free ends of the clip may be bent downwardly at right angles and be received in holes (not shown) in the lower walls of the slots. In some instances either the spring 42, or the spring clip may be eliminated.

Nut grommets 50 which match the threads of the studs 40 are mounted in a panel 52, having the same contour but of slightly larger dimensions than frame opening 14A, anh are retained by a tapered washer 54 (FIGS. 5 and 6). This washer serves to align the nut with the stud 40 by mating in a counter sunk hole 56 in the frame 14.

The operator unit 10 is a speed reducer and comprises a worm 58 and a worm-wheel 60 mounted on the shaft 18 as best shown in FIG. 3. The shaft 18 and worm 58 are suitably journalled in a housing 59. The worm 58 is provided with a hexagonal socket-wrench hole 62 which permits either manual or power operation by insertion of the proper tool. It is more efficiently driven by a reversible power tool such as an impact wrench. The incorporation of such a power tool permanently in the system may also be considered practical in some instances. With this arrangement the operation of the mechanism can be provided with push button control.

It will be noted that many modifications in the design of the structure may be desirable or necessary. One example is a right-angle operator, as shown in FIG. 4, wherein a worm 64 drives a worm-wheel 66 upon a shaft 68 which in turn drives a shaft 70 through miter gears 72 and 74 all located within a housing 75.

A great variety of arrangements and designs will immediately become apparent from the above description. Two such arrangements are shown in FIGS. 7 and 8. The arrangement shown in FIG. 7 includes three separate "chains" of fastening devices. One chain comprises an operator 76 and twelve receptacles which are divided into seven receptacles coupled to one side of the operator and five coupled to the other side. A second operator 78 is connected in a similar manner and the third operator 80 drives six receptacles on each side. All three chains comprise the means for fastening a single panel to the edges of a frame opening which, due to its extended nature, may require such an arrangement. The arrangement shown in FIG. 8 includes a similar configuration as that of FIG. 7 but includes a master operator 82 which is connected directly to two slave operators 83 and 84, and through a right angle drive 86 to a third slave operator 88. Each operator controls twelve receptacles similar to those in FIG. 7.

From the above description it will become apparent that to operate a seam fastener, such as illustrated in FIG. 1, first the panel 52 is placed over the margin of the opening 14A so that the tapered washers 54 fall into the countersunk holes 56, as shown in FIGS. 5 and 6, thereby aligning the nut-grommets 50 with the threaded studs 40 in receptacles 12 which are permanently carried around the margins of opening 14A in the frame. Then a power tool is inserted into the hexagonal socket 62 in the operator worm 58 which is rotated thereby. Motion is transmitted from the worm to the worm-wheel 60 and shaft 18 thence through the universal coupling 22 to the shaft 20 in the first receptacle in the chain and worm 26. This rotates the worm-wheel 28 and drives the cylinder 30 through pins 44 co-acting with the teeth in the circular racks 32.

The rotating cylinder, by virtue of its internal splines 36, rotates the stud 40 which thereby threads itself into the nut-grommet 50 to tighten the panel 52. The rotating shaft 20 of the first receptacle transmits motion through a universal coupling 21, at the opposite end from whence it received motion, to the shaft of the second receptacle in the chain and thence to its respective stud, and so on to the end of the chain. The resilience of the springs 45 allows the pins 44 to slip over the teeth in the circular racks 32 after a predetermined torque is reached thus preventing stripping of the threads. Equally important, the slipping of the pins 44 over the teeth permits the worm 26 to continue to rotate for the purpose of transmitting torque to the other receptacles in the chain which, in the event that their threaded studs become engaged with the nut-grommets later than the first stud, have not yet been pulled up to the required torque. In this respect it may be observed that each threaded stud acts independently.

After the panel has been duly assembled in place, as described above, it can be very quickly unfastened by inserting the power tool into the hexagonal socket 62 and reversing the direction of rotation which in turn reverses the rotation of the components through the chain thereby unscrewing the studs 40 out of the nut-grommets 50.

It will be noted that each of the studs 40 is provided with a hexagonal socket wrench opening 47 to permit individual tightening or loosening of the studs.

The explanation of the operation up to this point has been directed to an arrangement similar to that illustrated in FIG. 1 wherein a single chain of units is used. Reference is taken now to FIG. 7 which illustrates the use of three separate chains. The operation is the same as that described above except that there are three units that must be driven separately by the power tool. FIG. 8 illustrates the same three units but includes a master operator in which the power tool is inserted to drive all three chains simultaneously.

In the modified arrangement of FIG. 10 the circular toothed ratchets 32 at the upper and lower ends of the worm gear are replaced by a ball detent arrangement wherein the worm wheel 110, with its peripheral gear teeth 111 and driven by worm 112, is provided with a plurality of longitudinally disposed through bores 114 adjacent its periphery and balls 116 at opposite ends of each bore are urged outwardly by a spring 118. Upper and lower detent plates 119 have recesses 120 shaped to receive the balls. It is preferred to have the same number of recesses 120 in each detent plate to provide a different number of ball detents. For instance, if there are 15 sets of recesses and 10 longitudinal bores 114, each containing the spring pressed balls 116 at opposite ends thereof, a ball will become fully seated in a recess at each small increment of rotation of the worm gear, and at least two balls will be almost fully seated at all times.

This application is a continuation of my application Serial No. 64,048, filed October 21, 1960 now abandoned.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. A modular seam fastener assembly for securing a cover provided with spaced threaded holes around its perimeter to a structure having an opening to be closed by said cover and comprising a plurality of fastener units all secured in spaced relation around said opening and flexible shafts connecting said units, each unit comprising a frame, a threaded stud which moves into one hole in the cover for securing the latter to the structure, means for moving the stud outwardly into said hole, a worm connected to said flexible shaft, a worm wheel driven thereby and a slip-clutch driving connection between the worm wheel and the stud, said stud, worm and worm wheel journalled within the frame, and common driving means for driving said shafts.

2. The structure recited in claim 1 wherein the driving means comprises a driving shaft connected with said connecting shafts, a speed reducing unit connected with said driving shaft.

3. The structure recited in claim 1 wherein the slip-clutch connection comprises ball detents on one of said members, the other member having a receiver to receive the ball detents.

4. The structure recited in claim 1 wherein a spring urges the stud into said threaded hole.

5. The structure recited in claim 1 wherein a sleeve is interposed between the worm wheel and the stud and the latter is slidably mounted within the sleeve.

6. The structure recited in claim 1 wherein the shafts connecting said units are flexible cables.

7. A modular seam fastener assembly for securing a cover provided with spaced threaded holes around its perimeter to a structure having an opening and comprising a driver unit provided with a driving shaft provided with speed reducing means, and a plurality of fastener units all secured in spaced relation around said opening and flexible shafts connecting said units with said driving shaft, whereby power applied to the latter will operate the fastener units, each such unit comprising a housing, a threaded stud which moves into said threaded hole in the cover for securing the latter to the structure, means for moving the stud outwardly into said hole, a worm connected to said flexible shaft, a worm wheel driven thereby and a slip-clutch driving connection between the worm wheel and the stud, said stud, worm and worm wheel journalled within the housing.

8. A modulator seam fastener assembly for securing a cover provided with spaced threaded holes around its perimeter to a structure having an opening to be closed by said cover, and comprising a driver unit provided with a driving shaft, and a plurality of fastener units all secured in spaced relation around said opening and flexible shafts connecting said units with said driving shaft, whereby power applied to the latter will operate the fastener units, each unit comprising a frame, a threaded stud which moves into one hole in the cover for securing the latter to the structure, means for moving the stud outwardly into said hole, a worm connected with said flexible shaft, a worm wheel driven thereby and a slip-clutch driving connection between the worm wheel and the stud, said stud, worm and worm wheel journalled within the frame.

9. A modular seam fastener assembly for securing a cover provided with spaced holes around its perimeter to a structure having an opening to be closed by said cover, and comprising a driver unit provided with a driving shaft and a plurality of fastener units all secured in spaced relation around said opening and flexible shafts connecting said units with said driving shaft, whereby power applied to the latter will operate each fastener unit, each such unit comprising a housing, a stud which moves into one of the holes in the cover for securing the latter to the structure, a worm connected to said flexible shaft, a worm wheel driven thereby and a slip-clutch driving connection between the worm wheel and the stud, said stud, worm and worm wheel journalled within the housing, and means urging the stud out of the housing.

10. A modular seam fastener assembly for securing a cover provided with spaced threaded holes around its perimeter to a structure having an opening to be closed by said cover and comprising a driver unit provided with a driving shaft and a plurality of fastener units all secured in spaced relation around said opening and flexible shafts connecting said units with said driving shaft, whereby power applied to the latter will operate such fastener units, each such unit comprising a frame, a threaded stud which moves into one opening in the cover for securing the latter to the structure, a worm connected to said flexible shaft, a worm wheel driven thereby, a sleeve within the worm wheel, the stud mounted for non-rotative but sliding movement within the sleeve, and a slip-clutch driving connection between the worm wheel and the sleeve, said stud, worm and worm wheel being journalled within the frame, and means urging the stud out of the frame upon rotation of said stud.

11. The structure recited in claim 10 wherein said stud urging means comprises a spring nut yieldingly engaging a thread of the stud.

12. The structure recited in claim 1 wherein the means for moving the stud outwardly comprises a spring nut yieldably engaging a thread of the stud.

13. A fastener unit for securing a member having a threaded opening to a second member, said unit being secured to said second member and comprising a frame, a sleeve, a worm, and a worm wheel, driven by the worm, journalled for rotation in the frame, a threaded stud mounted for sliding movement in the sleeve and means for producing conjoint rotation of the sleeve and stud, means for moving the stud outwardly during rotation so that its thread engages the thread in the first member, and a slip clutch driving connection between the worm wheel and the stud.

14. A fastener unit for securing a first member having an opening provided with threads to a second member including in combination a frame carried by said second member, a threaded stud for engaging said opening threads, means mounting said stud on said frame for rotary movement around an axis and for movement in the direction of said axis between a first position at which said stud is out of engagement with said threads and a second position at which said stud engages said threads, means comprising a slip clutch for rotating said stud around said axis and means responsive to rotary movement of said stud for moving said stud in the direction of said axis between said positions.

15. A fastener unit for securing a first member having an opening provided with threads to a second member including in combination a frame carried by said second member, a threaded stud for engaging said opening threads, means mounting said stud on said frame for rotary movement around an axis and for movement in the direction of said axis between a first position at which said stud is out of engagement with said threads and a second position at which said stud engages said threads, means comprising a slip clutch for rotating said stud around said axis and means comprising a spring responsive to rotary movement of said stud for moving said stud in the direction of said axis between said positions.

16. A fastener unit for securing a first member having an opening provided with threads to a second member including in combination a frame carried by said second member, a threaded stud for engaging said opening threads, means mounting said stud on said frame for rotary movement around an axis and for movement in the direction of said axis between a first position at which said stud is out of engagement with said threads and a second position at which said stud engages said threads, means comprising a slip clutch for rotating said stud around said axis and a spring nut engaging said threaded stud for moving said stud in the direction of said axis between said positions in response to rotary movement of said stud.

References Cited in the file of this patent
UNITED STATES PATENTS

| | | |
|---|---|---|
| 2,713,799 | Crichton et al. | July 26, 1955 |
| 2,722,725 | Moore | Nov. 8, 1955 |
| 2,753,202 | Smith et al. | July 3, 1956 |